(12) United States Patent
Sangiamwong et al.

(10) Patent No.: US 8,681,746 B2
(45) Date of Patent: Mar. 25, 2014

(54) RADIO COMMUNICATIONS APPARATUS, RADIO COMMUNICATIONS METHOD, AND RADIO COMMUNICATIONS SYSTEM FOR REDUCING OVERHEAD OF A TRANSMIT FRAME

(75) Inventors: Jaturong Sangiamwong, Yokosuka (JP);
Takahiro Asai, Yokosuka (JP);
Hidekazu Murata, Hirakata (JP);
Susumu Yoshida, Uji (JP)

(73) Assignee: NTT DoCoMo, Inc., Tokyo (JP)

( * ) Notice: Subject to any disclaimer, the term of this patent is extended or adjusted under 35 U.S.C. 154(b) by 928 days.

(21) Appl. No.: 12/783,141

(22) Filed: May 19, 2010

(65) Prior Publication Data

US 2010/0309863 A1 Dec. 9, 2010

(30) Foreign Application Priority Data

Jun. 9, 2009 (JP) ................................. 2009-138649

(51) Int. Cl.
*H04W 4/00* (2009.01)

(52) U.S. Cl.
USPC .......................................................... 370/334

(58) Field of Classification Search
USPC .............. 370/310, 310.2, 313, 328, 329, 252, 370/332, 334, 341, 343, 431, 436
See application file for complete search history.

(56) References Cited

U.S. PATENT DOCUMENTS 7,308,035 B2 * 12/2007 Rouquette et al. ............ 375/267
2007/0070944 A1 * 3/2007 Rinne et al. .................... 370/329

OTHER PUBLICATIONS

Mai Vu, et al., "MIMO Wireless Linear Precoding", IEEE Signal Processing Magazine, vol. 24, No. 5, Sep. 2007, pp. 86-105.
3GPP TS 36.211 V8.5.0, "Physical Channels and Modulation", Dec. 2008, 82 pages.

* cited by examiner

*Primary Examiner* — Anh Ngoc Nguyen
(74) *Attorney, Agent, or Firm* — Oblon, Spivak, McClelland, Maier & Neustadt, L.L.P.

(57) ABSTRACT

A radio communications apparatus is disclosed which includes a generator which generates a transmit frame; and a transmitter which transmits the transmit frame via multiple transmit antennas. In the radio communications apparatus, the transmit frame includes a predetermined number of resource elements having a predetermined frequency bandwidth and a predetermined symbol period, and the generator generates the transmit frame such that the number of transmit antennas which are identifiable from a location of the resource element taken up by a pilot signal in a certain transmit frame is less than the number of transmit antennas which are identifiable from the location of the resource element taken up by the pilot signal in a retransmission transmit frame of the certain transmit frame.

15 Claims, 14 Drawing Sheets

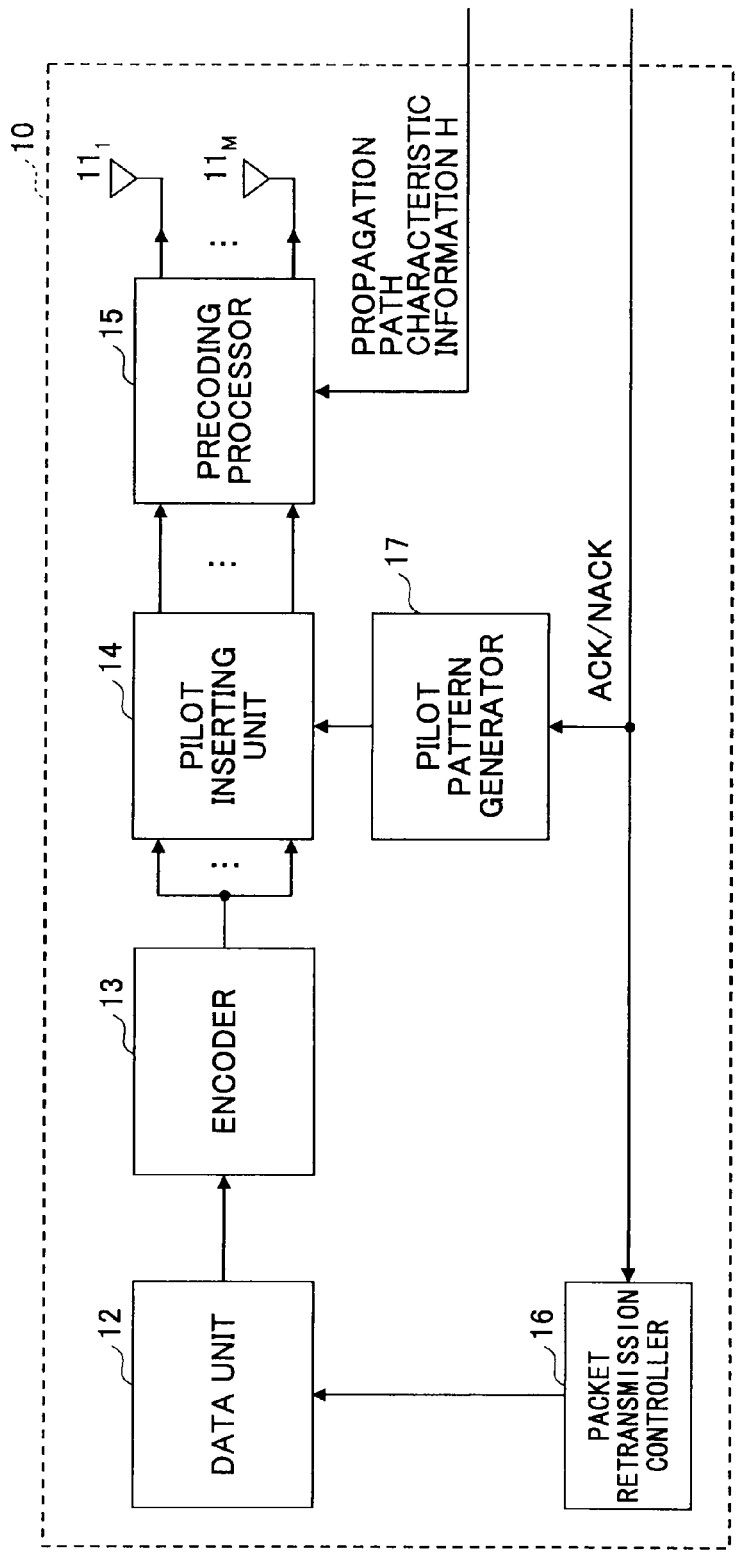

RADIO COMMUNICATIONS APPARATUS, RADIO COMMUNICATIONS METHOD, AND RADIO COMMUNICATIONS SYSTEM FOR REDUCING OVERHEAD OF A TRANSMIT FRAME

BACKGROUND OF THE INVENTION

1. Field of the Invention

The present invention relates to radio communications apparatuses with multiple antennas, radio communications methods, and radio communications systems.

2. Description of the Related Art

A base station in a radio communications system that has multiple transmit antennas can precode a transmit signal to improve received signal quality at a mobile station. This type of scheme is disclosed in Non-patent document 1.

Generally, the precoding is performed by applying, in advance to the transmit signal, an inverse characteristic $H^{-1}$ of a propagation path characteristic H between the base station and the mobile station. When there are multiple transmit antennas, directivity can be adjusted using the precoding. Therefore, the information on the propagation path characteristic H must be obtained by the base station in order to precode the transmit signal at the base station. More specifically, for a frequency division duplexing (FDD) system, the propagation path characteristic is not the same between uplink and downlink. Therefore, there is a need for the base station to transmit a pilot signal to the mobile station, for the mobile station to estimate the downlink propagation path characteristic based on the pilot signal, and for the mobile station to report, to the base station, information on the estimated propagation path characteristic. The greater the number of transmit antennas at the base station, the greater an improvement effect due to precoding can be expected. However, as the number of transmit antennas increases, the number of propagation paths to be estimated increases, causing a need to increase the number of pilot signal types.

FIG. 1 shows an exemplary signal configuration for transmitting a pilot signal from multiple transmit antennas. This type of exemplary signal configuration is disclosed in Non-patent document 2. FIG. 1 illustrates how the pilot signal is mapped for the numbers of transmit antennas at a base station of 1, 2, and 4. In the exemplary signal configuration in FIG. 1, it is anticipated to use an orthogonal frequency division multiplexing (OFDM) scheme. In the example shown, all of the pilot signals transmitted from the respective transmit antennas are arranged such that they do not overlap in both time and frequency domains. As a result, as the number of transmit antennas used by the base station increases, the number of pilot signals increases as well. For example, for a case of the number of transmit antennas at the base station being 2, the number of pilot signals within a frame doubles relative to a case of the number of transmit antennas being 1; and for a case of the number of transmit antennas being 4, the number of pilot signals triples. In other words, as the number of transmit antennas at the base station increases, a proportion of pilot signals in a transmit frame (overhead) increases, causing a decrease in radio resources for a data signal, etc.

Now, in this type of radio communications systems, automatic repeat request (ARQ) or hybrid automatic repeat request (HARQ) is performed, and, if an error is detected in a received packet, the packet is retransmitted. In a related art radio communications system, even in cases of retransmission, a pilot signal is transmitted, in all of the cases, using a configuration as shown in FIG. 1.

Therefore, there is a problem that, when the number of transmit antennas are great, overhead in a transmit frame becomes significantly large. Such a problem is of concern in uplink as well as downlink.

NON-PATENT DOCUMENT

Non-patent document 1 M. Vu and A. Paulraj, "MIMO Wireless Linear Precoding, "IEEE Signal Processing Magazine, vol. 24, no. 5, pp. 86-105, September 2007.

Non-Patent Document 2 3GPP TS36.211. V8.5.0, Sec. 6. 10

SUMMARY OF THE INVENTION

The problem to be solved by the present invention is to reduce overhead of a transmit frame in a multi-carrier radio communications system which transmits packets performed precoding.

According to an embodiment of the present invention, a radio communications apparatus includes a generator which generates a transmit frame; and a transmitter which transmits the transmit frame via multiple transmit antennas. The transmit frame includes a predetermined number of resource elements having a predetermined frequency bandwidth and a predetermined symbol period. The generator generates a transmit frame such that the number of transmit antennas which are identifiable from a location of a resource element taken up by a pilot signal in a certain transmit frame is less than the number of transmit antennas which are identifiable from a location of a resource element taken up by a pilot signal in a retransmission transmit frame of the certain transmit frame.

According to an embodiment of the present invention, a radio communications method includes the steps of generating a transmit frame and wirelessly transmitting the transmit frame via multiple transmit antennas. The transmit frame includes a predetermined number of resource elements having a predetermined frequency bandwidth and a predetermined symbol period. The generating step generates the transmit frame such that the number of transmit antennas which are identifiable from a location of a resource element taken up by a pilot signal in a certain transmit frame is less than the number of transmit antennas which are identifiable from a location of a resource element which is taken up by a pilot signal in a retransmission transmit frame of the certain transmit frame.

According to an embodiment of the present invention, a radio communications system includes a base station; and a mobile station. The base station includes a generator which generates a transmit frame; and a transmitter which transmits the transmit frame via multiple transmit antennas. The mobile station includes a receiver which receives the transmit frame; an estimator which estimates a radio propagation condition based on a pilot signal in the transmit frame; and a transmitter which transmits, to the base station, an estimation result by the estimator. The transmitter of the base station has a precoder which precodes the transmit frame based on an estimation result of a radio propagation condition received from the mobile station. The transmit frame includes a predetermined number of resource elements having a predetermined frequency bandwidth and a predetermined symbol period. The generator generates a transmit frame such that the number of transmit antennas which are identifiable from a location of a resource element taken up by a pilot signal in a certain transmit frame becomes less than the number of transmit antennas which are identifiable from the location of the resource element taken up by the pilot signal within a retransmission transmit frame of the certain transmit frame.

The disclosed invention makes it possible to reduce overhead of a transmit frame in a multi-carrier radio communications system which transmits packets performed precoding.

BRIEF DESCRIPTION OF THE DRAWINGS

FIG. 3A is a functional block diagram of a base station according to one embodiment;

DETAILED DESCRIPTION OF PREFERRED EMBODIMENTS

Figure 1:
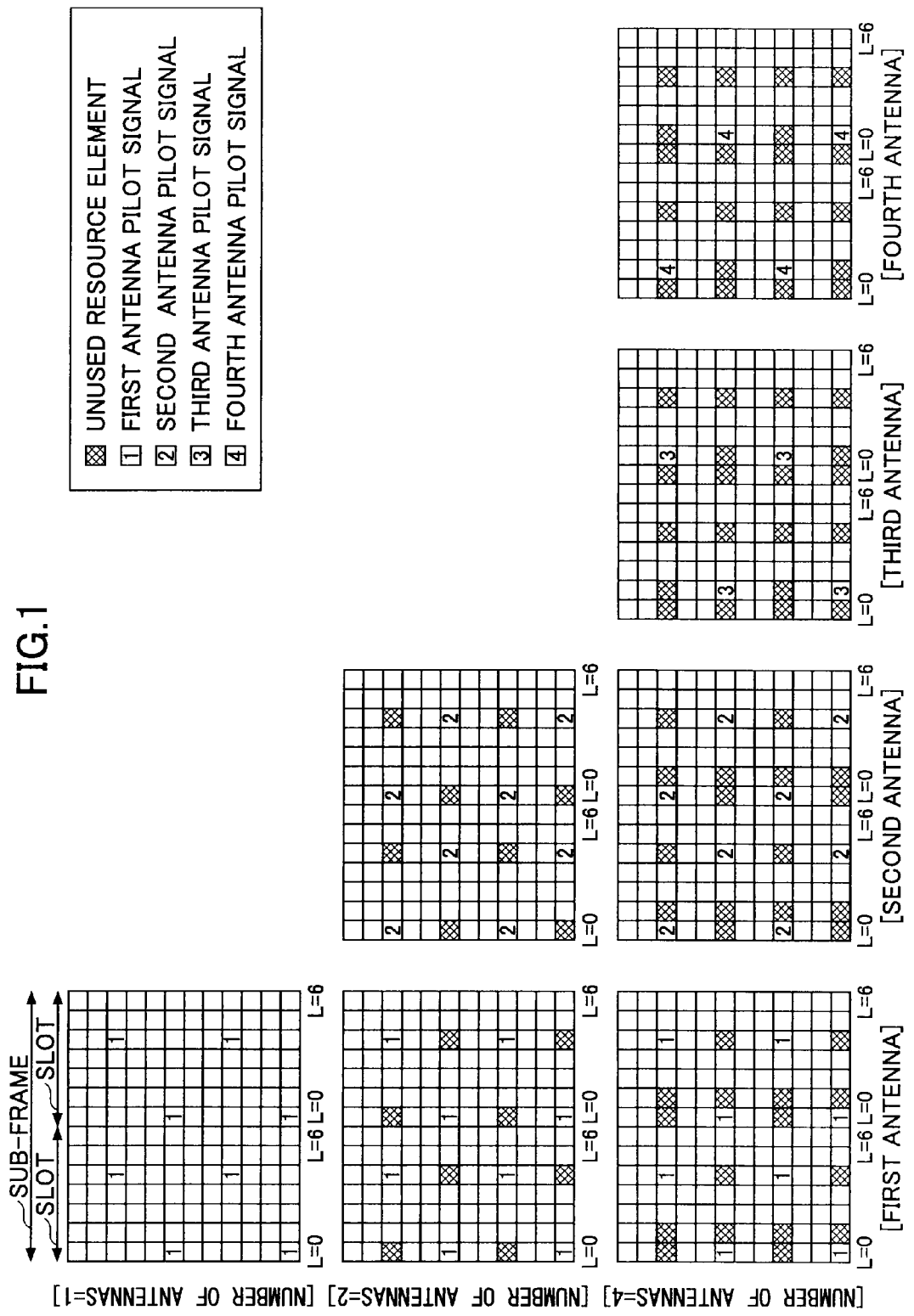
FIG. 1 is a diagram illustrating a location of a pilot signal within a transmit frame.

According to a first feature of the present invention, a multi-antenna radio communications system including a base station having multiple antennas; and a mobile station is provided. The base station includes a pilot pattern generating unit which changes the number of transmit pilot patterns in each transmit antenna such that the number of transmit pilot patterns is increased as the number of retransmissions of retransmission packets increases and a precoding processing unit which precodes a transmit signal transmitted from the multiple transmit antennas. The mobile station includes a propagation path estimating unit which estimates information on a characteristic of a propagation path from the base station to the mobile station based on the transmit pilot signals from the multiple antennas of the base station and a reporting unit which reports, to the base station, the propagation path characteristic information estimated at the propagation path estimating unit. The precoding is performed based on the propagation path characteristic information.

The above-described feature makes it possible to suppress transmit frame overhead as much as possible by changing transmit pilot patterns in each transmit antenna such that the number of transmit pilot patterns is increased as the number of retransmissions of retransmission packets increases.

According to a second feature of the present invention, the pilot pattern generating unit doubles the number of transmit pilot patterns as the number of retransmissions of retransmission packets increases. The number of transmit antennas of the base station is generally a multiple of 2, which is desirable from a point of view of easily realizing the present invention.

According to a third feature of the present invention, the precoding processing unit precodes the transmit signal such that a precoding gain is increased with an increase in the number of retransmissions of the retransmission packet.

This feature makes it possible for the base station to precode a retransmission packet based on propagation path characteristic information which is estimated by the mobile station using a pilot signal transmitted with a preceding packet and to achieve an improvement in received signal quality at the mobile station.

According to a fourth feature of the present invention, the pilot pattern generating unit forces the number of pilot patterns to 1 when the number of retransmissions of a retransmission packet reaches the maximum number of retransmissions.

When the number of retransmissions of a retransmission packet reaches the maximum number of retransmissions, retransmission is not thereafter performed for the packet. Thus, a pilot signal for precoding at the time of retransmission of the packet becomes unnecessary. Forcing the number of pilot patterns to 1 makes it possible to reduce transmit frame overhead.

According to a fifth feature of the present invention, the base station further includes a channel encoding unit. When the number of transmit pilot patterns is increased, the channel encoding rate for the data signal is controlled such that the number of overall resource elements including both pilot and data signals are maintained constant when the number of transmit pilot patterns are increased.

The above-described feature makes it possible to increase the number of patterns without decreasing information symbols to be transmitted in a transmit packet even when the pilot signals in packet retransmission (frame overhead) increase.

Embodiments of the present invention are described from the following points of view:
1. System
2. Base station
3. Mobile station
4. Pilot pattern
5. Exemplary operation of base station
6. Exemplary operation of base station and mobile station
7. First variation
8. Second variation
9. The other variations Embodiment 1

1. System

Figure 2:
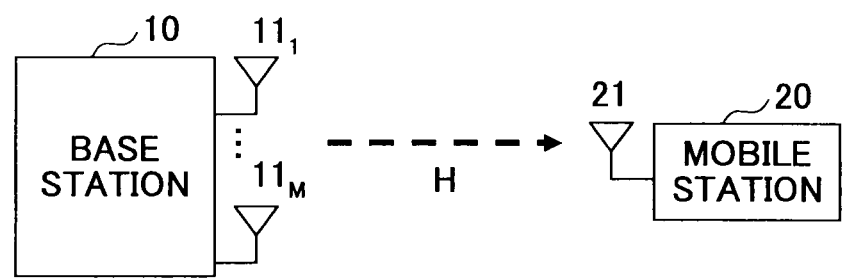
FIG. 2 is a diagram illustrating a radio communications system according to one embodiment.

FIG. 2 illustrates a radio communications system for use in one embodiment of the present invention. FIG. 2 shows a base station 10 having multiple transmit antennas $11_1$ to $11_M$ and a mobile station 20 having a single antenna. Here, it is assumed that the base station 10 and the mobile station 20 are connected via a radio link with a propagation path characteristic expressed as H. In this case, the propagation path characteristic H may be expressed as a matrix (in the present example, a row vector) having one row and M column dimensions. The matrix may be referred to as a channel matrix. M is the number of transmit antennas.

$$H=[h_{1,1} \ldots h_{1,M}] \quad \text{(Equation 1)}$$

In the above Equation (1), $h_{1,1}$ represents a propagation path characteristic between a transmit antenna $11_1$ of the base station 10 and a receive antenna 21 of the mobile station 20. Similarly, $h_{1,M}$ represents a propagation path characteristic between a transmit antenna $11_M$ of the base station 10 and a receive antenna 21 of the mobile station 20.

The fact that the number of antennas at the mobile station is one is merely assumed for achieving brevity and clarity of explanation and is not essential to the present invention. The mobile station may have multiple antennas, so that MIMO-type communications may be conducted between the base station and the mobile station. In this case, the propagation path characteristic is expressed using an N row, M column matrix. In this case, N represents the number of receive antennas, and M represents the number of transmit antennas.

In the illustrated radio communications system, the multi-carrier communications are conducted in downlink from the base station 10 to the mobile station 20. Typically, orthogonal frequency divisional multiple access (OFDM) communications are conducted. Moreover, in the radio communications system, hybrid ARQ and precoding are also performed. However, the present invention is not only applicable to downlink as described above, but also widely applicable to radio communications systems which transmit multiple pilot signals from multiple transmit antennas.

2. Base Station

FIG. 3A illustrates functions which are particularly related to the present embodiment, of functions of the base station as illustrated in FIG. 2. FIG. 3A shows a data unit 12, an encoder 13, a pilot inserting unit 14, a precoding processor 15, an antenna 11, a packet retransmission controller 16, and a pilot pattern generator 17. Generally, the data unit 12, the encoder 13, and the pilot inserting unit 14 correspond to a generator which generates a transmit frame. However, such an association is not to limit the present invention.

The data unit 12 generates data to be transmitted as an initial transmission packet or a retransmission packet. The data are typically data such as user traffic data.

The encoder 13 channel encodes data supplied from the data unit 12, and modulates the data. When an adaptive modulation and channel encoding (AMC) scheme is used, the channel encoding rate and data modulation scheme are adaptively changed based on downlink quality (expressed as CQI, etc.) that is reported from the mobile station, for example.

The pilot inserting unit 14 multiplexes control signals not shown (a synchronization signal, a broadcast signal, information required for demodulating the data signal, etc.), a pilot signal, and a signal supplied from the encoder 13. The pilot signal, which is a signal known at the transmitter and the receiver, may be also referred to as a known signal, a reference signal, etc. The pilot signal is used for a mobile station 20 to estimate a propagation path characteristic H. The pilot inserting unit 14 uses pilot pattern information generated from the pilot pattern generator 17 to insert a pilot signal into the transmit frame. The pilot pattern will be described below with reference to FIGS. 4 to 6.

The precoding processor 15 precodes a signal supplied from the pilot inserting unit 14 based on information (information representing a propagation path characteristic H) reported from the mobile station 20. The precoded signal is transmitted from multiple antennas $11_1$ to $11_M$.

Figure 3B:
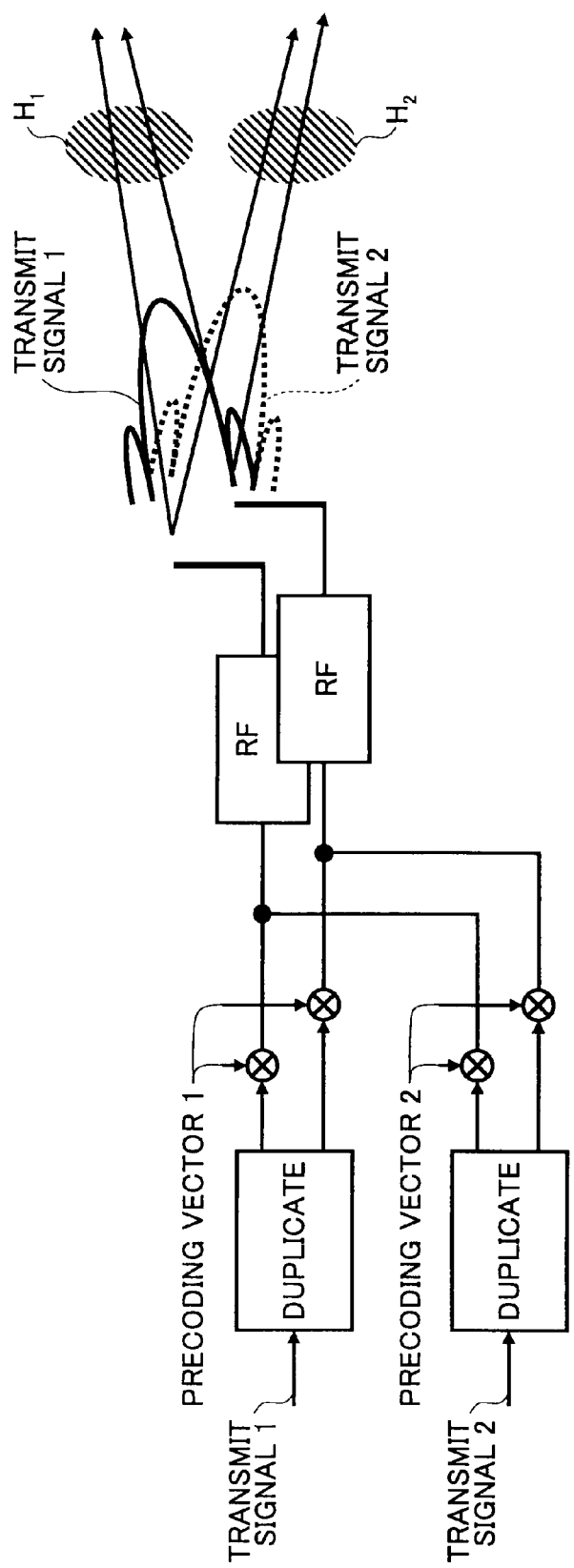
FIG. 3B is a diagram showing how precoding is performed using two transmit antennas.

FIG. 3B schematically shows how precoding is performed using two transmit antennas. The transmit signal 1 is duplicated into two portions, by each of which portions a precoding vector 1 is multiplied, which multiplied results are transmitted from the two antennas. The precoding vector 1 is multiplied by the transmit signal 1 to apply in advance to the transmit signal 1 a process which takes into account directivity and a propagation path characteristic $H_1$ of a radio propagation path of the transmit signal 1. In this way, a communications counterpart which receives the transmit signal 1 may receive the transmit signal 1 in high quality. Similarly, the transmit signal 2 is also duplicated into two portions, to each of which portions a precoding vector 2 is multiplied, which multiplied results are transmitted from the two antennas. The precoding vector 2 is multiplied by the transmit signal 2 to apply in advance to the transmit signal 2 a process which takes into account directivity and a propagation path characteristic $H_2$ of a radio propagation path of the transmit signal 2. In this way, a communications counterpart which receives the transmit signal 2 may receive the transmit signal 2 in high quality.

The packet retransmission controller 16 in FIG. 3A performs packet retransmission control based on an acknowledgement signal (ACK/NACK) reported from the mobile station 20. When the base station 10 transmits a data signal to the mobile station 20, and the mobile station receives the data signal, the mobile station determines, for the received data signal, whether an error exists. The result of error detecting is expressed as acknowledgement (ACK) or non-acknowledgement (NACK). The acknowledgement signal (ACK/NACK), which indicates the result of error detecting, is reported from a mobile station to a base station. When ACK is reported to the base station, the packet retransmission controller 16 reports to the data unit 12 that there is no need to retransmit the packet. As a result, the data unit 12 outputs succeeding new packet data to the encoder 13. On the other hand, when NACK is reported to the base station, the packet retransmission controller 16 reports to the data unit 12 that there is a need to retransmit the packet. As a result, the data unit 12 outputs data which are the same as the previously transmitted packet to the encoder 13.

3 Mobile Station

Figure 3C:
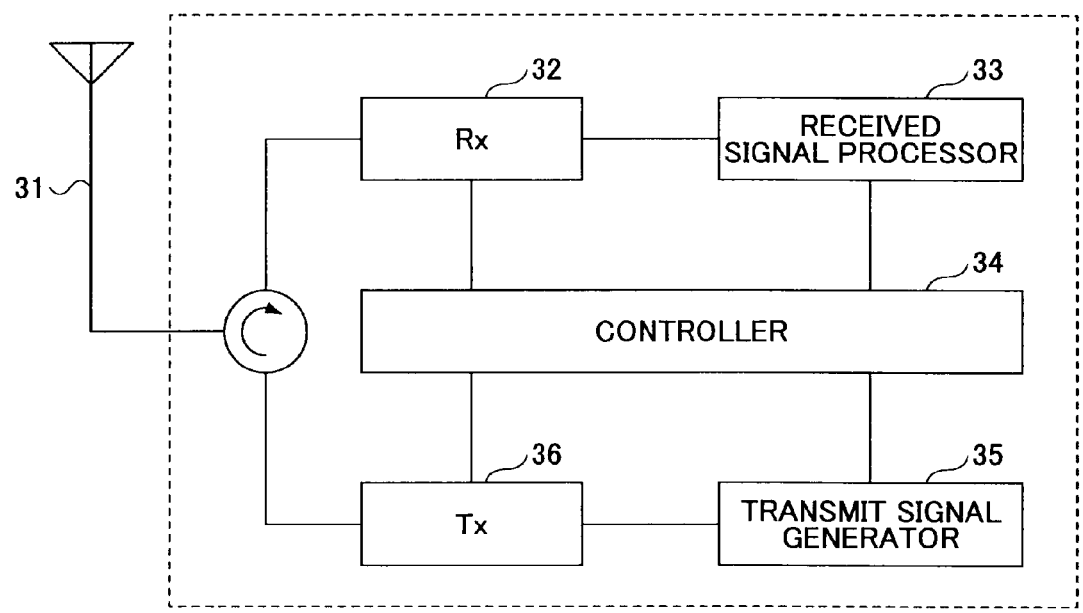
FIG. 3C is a functional block diagram of a mobile station according to one embodiment.

FIG. 3C illustrates functions which are particularly related to the present embodiment, of functions of the mobile station as illustrated in FIG. 2. FIG. 3C shows an antenna 31, a receiver (Rx) 32, a received signal processor 33, a controller 34, a transmit signal generator 35, and a transmitter (Tx) 36. What the present explanation refers to as the mobile station may be referred to as a mobile terminal, a user apparatus, a subscriber apparatus, etc.

The antenna 31, which is shown as a single antenna, may be provided as multiple antennas.

The receiver (Rx) 32 receives a radio signal from the base station, and converts the received signal into a received digital base band signal.

The received signal processor 33 performs a process of reconstructing a signal transmitted from the base station from a received signal. More particularly, in the present embodiment, the received signal processor 33 performs processes such as extracting a pilot signal from a received signal; estimating a radio propagation path; performing channel compensation; demodulating a control signal and a data signal; and error checking on the data signal.

The controller 34 controls various functional elements of the mobile station.

The transmit signal generator 35 generates a signal to be transmitted to the base station. More particularly, the transmit signal generator 35 generates a signal including information showing an estimated result of the radio propagation path and information showing an error detection result.

The transmitter (Tx) 36 transmits a signal generated from the transmit signal generator to the base station.

4. Pilot Pattern

A pilot pattern for use in the pilot inserting unit 14 is described with reference to FIGS. 4 and 6. Generally, the pilot pattern is determined at the pilot pattern generator 17 according to the number of retransmissions. For convenience of explanation, the number of transmit antennas of the base station is assumed to be 4 (M=4). More (e.g., 8, 16) transmit antennas may be used. Generally, the base station transmits a pilot signal to the mobile station regardless of the presence of a downlink data signal. The mobile station measures a received level or received quality of a received pilot signal, and reports, to a base station, the measured result, or a propagation path characteristic derived from the measured result. This makes it possible for the base station to know the downlink propagation condition. In the present invention, the base station transmits a pilot signal to a specified mobile station, using different methods depending on each of cases of (a) no downlink data signal; (b) transmitting an initial downlink data signal; and (c) transmitting a retransmission downlink data signal.

(a) No Downlink Data Signal

Figure 4:
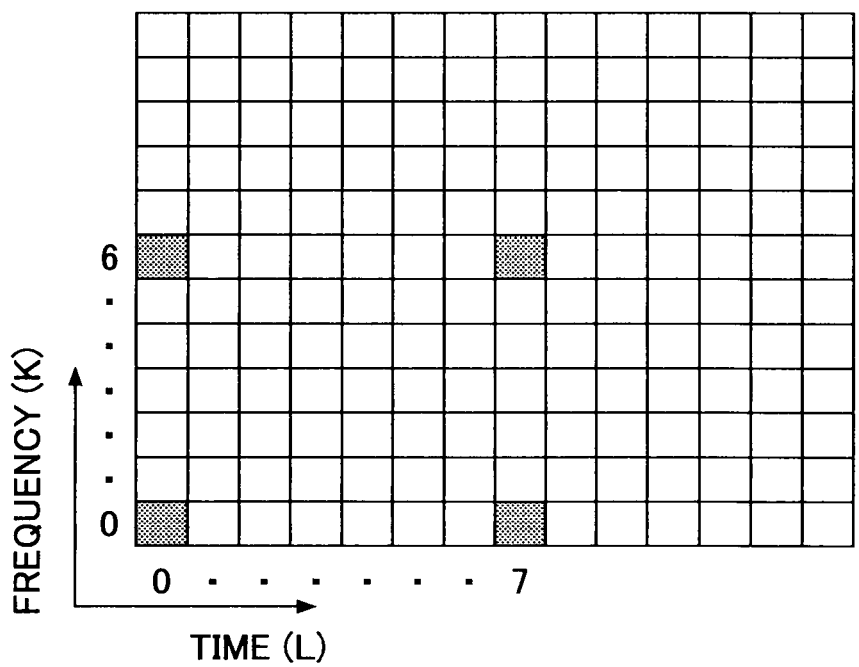
FIG. 4 is a diagram illustrating an exemplary pilot pattern which is common to four transmit antennas.

FIG. 4 shows with what pattern a pilot signal is transmitted when a downlink data signal is not transmitted to a specific mobile station but a pilot signal is transmitted to such a mobile station. The above-described pattern is herein referred to as a pilot pattern. The illustrated example shows one transmit frame which takes up a certain period and a certain bandwidth. The transmit frame, which corresponds to a sub-frame (TTI) or a unit transmission period such as 1 ms, for example, includes a predetermined number of OFDM symbols. In the example shown, the transmit frame includes 14 OFDM symbols, but there may be included, within a unit transmission period, any number of OFDM symbols. The transmit frame takes up a predetermined frequency bandwidth, and, in the example shown, 12 sub-carrier portions are shown. The number of sub-carriers included in the transmit frame is arbitrary. As an example, one sub-carrier takes up 15 kHz. For convenience of explanation, one OFDM symbol and one sub-carrier are referred to as resource elements. In the illustrated example, one resource block includes 14 OFDM symbols times 12 sub-carriers of resource elements. The downlink data signal is transmitted and received per resource block.

For the example shown in FIG. 4, the pilot signal is inserted into four resource elements. Herein, terms such as inserting, mapping, multiplexing, etc., are used synonymously as long as there is no concern over confusion. Let an index which designates a sub-carrier in the frequency domain be K, and let an index which designates an OFDM symbol in the time domain be L. In the illustrated example, the pilot signal is inserted into (K,L)=(0,0), (6,0), (0,7), and (6,7). These are shown as shaded resource elements. Only one pilot pattern is provided for four transmit antennas $11_1$, $11_2$, $11_3$ and $11_4$. In other words, this one pilot pattern is used in common for all transmit antennas when pilot signals of each of the transmit antennas $11_1$, $11_2$, $11_3$, and $11_4$ are inserted into a transmit frame.

More specifically, the pilot signal of a first transmit antenna $11_1$ is multiplexed into the four resource elements. The pilot signal of a second transmit antenna $11_2$ is also multiplexed into the four resource elements. The pilot signal of a third transmit antenna $11_3$ is also multiplexed into the four resource elements. The pilot signal of a fourth transmit antenna $11_4$ is also multiplexed into the four resource elements.

A transmit frame which is generated by multiplexing the pilot signals in this way is transmitted from the base station and received by the mobile station. The mobile station extracts a pilot signal from the transmit frame. The fact that the pilot signal is transmitted in a pattern shown in FIG. 4 is known at least at this time. Information on the pilot pattern may be reported using broadcast information or other signaling, or may be determined in a uniform manner by the system. The mobile station estimates a propagation path characteristic based on a pilot signal extracted. The resource element (K,L)=(0,0), (6,0), (0,7), and (6,7) within the received frame includes all pilot signals from each transmit antenna $11_1$, $11_2$, $11_3$, and $11_4$. As there is only one pilot pattern, the types of pilot signals and transmit antennas cannot be determined from the position of the resource elements. Therefore, the propagation path characteristic which can be estimated from the respective four resource elements is a combination of a propagation path characteristic $h_{1,1}$ between a transmit antenna $11_1$ of a base station and a receive antenna 21 of a mobile station; a propagation path characteristic $h_{1,2}$ between a transmit antenna $11_2$ of a base station and a receive antenna 21 of a mobile station; a propagation path characteristic $h_{1,3}$ between a transmit antenna $11_3$ of a base station and a receive antenna 21 of a mobile station; and a propagation path characteristic $h_{1,4}$ between a transmit antenna $11_4$ of a base station and a receive antenna 21 of a mobile station. In other words, information on a propagation path characteristic estimated by the mobile station 20 represents $$h = h_{1,1} + h_{1,2} + h_{1,3} + h_{1,4}$$

Figure 5A:
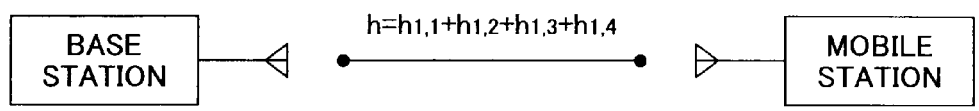
FIG. 5A is a diagram illustrating an equivalent radio communications system (with the number of transmit antennas=1)

As illustrated in FIG. 5A, this condition is equivalent to a condition in which communications are conducted between the base station and the mobile station when the number of transmit antennas of the base station is 1 and when the propagation path characteristic is h.

(b) Transmitting Initial Downlink Data Signal

Figure 6:
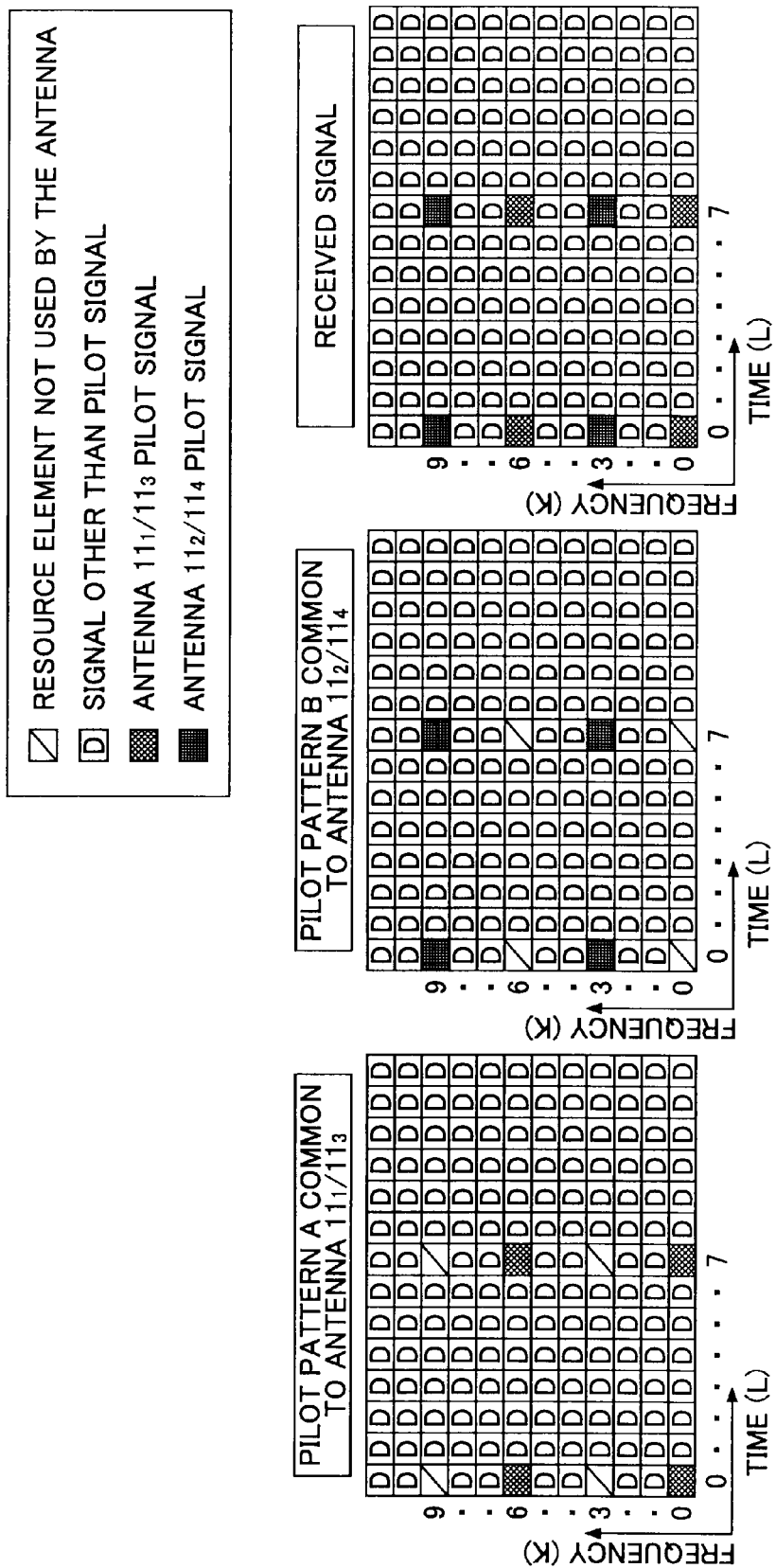
FIG. 6 is a diagram illustrating two pilot patterns which are common to two transmit antennas.

FIG. 6 shows a pilot pattern used when a data signal intended for a certain mobile station is transmitted as an initial packet. Compared to the pilot pattern of FIG. 4, the number of resource elements used in a pilot signal has doubled. Therefore, overhead has doubled. Unlike the pilot pattern shown in FIG. 4, proper use of two pilot patterns is made according to the transmit antennas. The four transmit antennas are grouped into two, and a different pilot pattern is used from group to group. A pilot pattern A is used for transmit antennas $11_1$ and $11_3$. A pilot pattern B is used for transmit antennas $11_2$ and $11_4$. As illustrated, pilot signals from transmit antennas $11_1$ and $11_3$ and pilot signals from transmit antennas $11_2$ and $11_4$ are arranged not to overlap in both time and frequency domains. In other words, a resource element used for a pilot signal in one pilot pattern is not used in the other pilot pattern.

For the pilot pattern A, the pilot signal is inserted into (K,L)=(0,0), (6,0), (0,7), and (6,7). For the pilot pattern B, the pilot signal is inserted into (K,L)=(3,0), (9,0), (3,7), and (9,7). Four resource elements are used in a pilot signal in FIG. 4, while eight resource elements are used in a pilot signal in FIG. 6.

The pilot signal of a first transmit antenna $11_1$ is mapped into the four resource elements of the pilot pattern A.

The pilot signal of a second transmit antenna $11_2$ is mapped into the four resource elements of the pilot pattern B.

The pilot signal of a third transmit antenna $11_3$ is mapped into the four resource elements of the pilot pattern A.

The pilot signal of a fourth transmit antenna $11_4$ is mapped into the four resource elements of the pilot pattern B.

The transmit frame generated in this way is received from the mobile station 20. The mobile station 20 extracts a pilot signal from the transmit frame. The fact that the pilot signals are transmitted in pilot patterns A and B shown in FIG. 6 is known at least at this time. This is the same as the pilot pattern shown in FIG. 4. The mobile station estimates a propagation path characteristic based on a pilot signal extracted. The transmit frame received by the mobile station is as shown in "the received signal" in FIG. 6.

For the pilot pattern A, the resource element (K,L)=(0,0), (6,0), (0,7), and (6,7) within the received frame includes pilot signals from each transmit antenna $11_1$ and $11_3$. Therefore, the propagation path characteristic which can be estimated from the four resource elements is a combination of a propagation path characteristic $h_{1,1}$ between the transmit antenna $11_1$ of the base station and the receive antenna 21 of the mobile station and propagation path characteristic $h_{1,3}$ between the transmit antenna $11_3$ of the base station and the receive antenna 21 of the mobile station. In other words, information on the propagation path characteristic that is estimated by the mobile station 20 according to the pilot pattern A shows a propagation path characteristic of $h_A = h_{1,1} + h_{1,3}$.

For the pilot pattern B, the resource element (K,L)=(3,0), (9,0), (3,7), and (9,7) within the received frame includes pilot signals from each transmit antenna $11_2$ and $11_4$. Therefore, the propagation path characteristic which can be estimated from the four resource elements is a combination of a propagation path characteristic $h_{1,2}$ between the transmit antenna $11_2$ of the base station and the receive antenna 21 of the mobile station and propagation path characteristic $h_{1,4}$ between the transmit antenna $11_4$ of the base station and the receive antenna 21 of the mobile station. In other words, information on the propagation path characteristic that is estimated according to the pilot pattern B shows a propagation path characteristic of $h_B = h_{1,2} + h_{1,4}$.

Figure 5B:
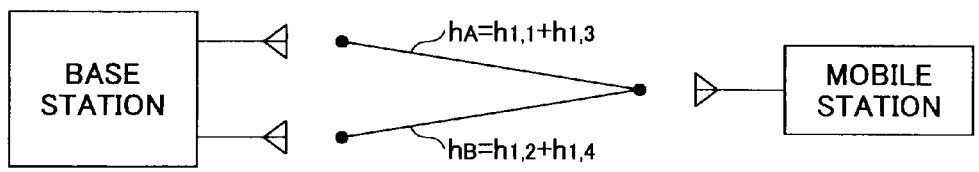
FIG. 5B is a diagram illustrating the equivalent radio communications system (with the number of transmit antennas=2)

As illustrated in FIG. 5B, this condition is equivalent to a condition in which communications are conducted between the base station and the mobile station when the number of transmit antennas of the base station is 2 and when the propagation path characteristic is $h_A$ and $h_B$.

The corresponding relationship (grouping of transmit antennas) between the pilot pattern and the transmit antennas of the base station is not limited to the above. For example, a pilot pattern A may be used for transmit antennas $11_1$ and $11_2$, while a pilot pattern B may be used for transmit antennas $11_3$ and $11_4$. Moreover, correspondence between the transmit antennas and the pilot patterns of the base station may be maintained in a fixed manner or dynamically changed. This is because it suffices that the corresponding relationship is known at both the transmitter and the receiver.

(c) Transmitting Retransmission Downlink Data Signal

Figure 7:
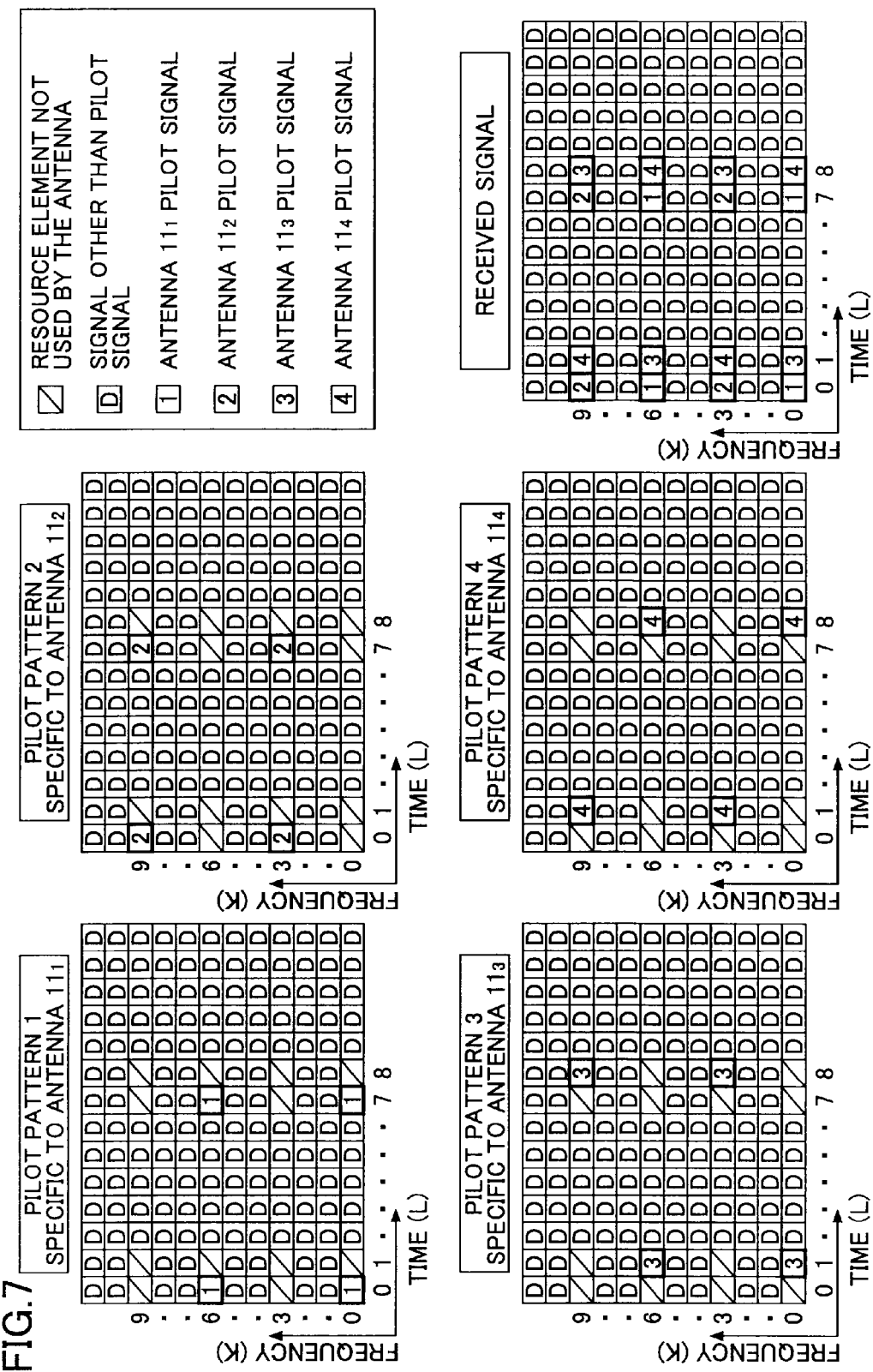
FIG. 7 is a diagram illustrating an exemplary pilot pattern used for each transmit antenna.

FIG. 7 shows a pilot pattern used when a data signal intended for a certain mobile station is transmitted as a retransmission packet. Compared to the pilot pattern of FIG. 4, the number of resource elements used in a pilot signal (the amount of radio resources) has quadrupled. Therefore, overhead has quadrupled. Compared to the pilot pattern of FIG. 6, the number of resource elements (the amount of radio resources) used in a pilot signal has doubled. In the example shown in FIG. 7, different pilot patterns are used from one transmit antenna to another. As shown, pilot signals from each transmit antenna $11_1$, $11_2$, $11_3$, and $11_4$ are arranged such that they do not overlap in both time and frequency domains. In other words, a resource element used for a pilot signal in a certain pilot pattern is not used in any of the other pilot patterns.

More specifically, the pilot signal transmitted from the antenna $11_1$ is inserted into (K,L)=(0,0), (6,0), (0,7), and (6,7) according to a pilot pattern 1. The pilot signal transmitted from the antenna $11_2$ is inserted into (K,L)=(3,0), (9,0), (3,7), and (9,7) according to a pilot pattern 2. The pilot signal transmitted from the antenna $11_3$ is inserted into (K,L)=(0,1), (6,1), (3,8), and (9,8) according to a pilot pattern 3. The pilot signal transmitted from the antenna $11_4$ is inserted into (K,L)=(3,1), (9,1), (0,8), and (6,8) according to a pilot pattern 4.

The transmit frame generated in this way is received by the mobile station 20. The mobile station 20 extracts a pilot signal from the transmit frame. The fact that the pilot signal is transmitted in a pilot pattern shown in FIG. 7 is known at least at this time. This is the same as the pilot pattern shown in FIG. 4, etc. The mobile station estimates a propagation path characteristic based on a pilot signal extracted. The transmit frame received by the mobile station is as shown in "the received signal" in FIG. 7.

The mobile station may extract only a pilot signal from the transmit antenna $11_1$ by using the pilot pattern 1.

Thus, the mobile station can estimate the propagation path characteristic $h_{1,1}$ between the transmit antenna $11_1$ of the base station and the receive antenna 21 of the mobile station.

The mobile station can use a pilot pattern 2 to extract only a pilot signal from a transmit antenna $11_2$ and estimate propagation path characteristic $h_{1,2}$ between the transmit antenna $11_2$ of the base station and the receive antenna 21 of the mobile station.

The mobile station can use a pilot pattern 3 to extract only a pilot signal from a transmit antenna $11_3$ and estimate propagation path characteristic $h_{1,3}$ between the transmit antenna $11_3$ of the base station and the receive antenna 21 of the mobile station.

Then, the mobile station can use a pilot pattern 4 to extract only a pilot signal from a transmit antenna $11_4$ and estimate propagation path characteristic $h_{1,4}$ between the transmit antenna $11_4$ of the base station and the receive antenna 21 of the mobile station.

Figure 5C:
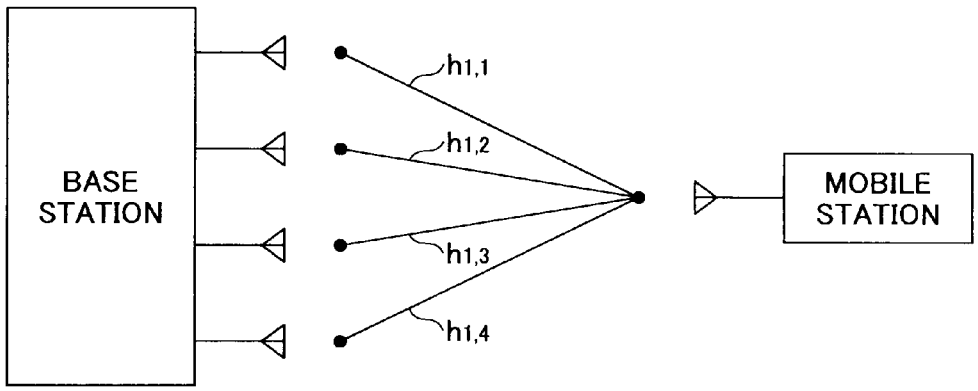
FIG. 5C is a diagram illustrating the equivalent radio communications system (with the number of transmit antennas=4)

As illustrated in FIG. 5C, this condition is equivalent to a condition in which communications are conducted between the base station and the mobile station when the number of transmit antennas of the base station is 4 and when the propagation path characteristic is $h_{1,1}$, $h_{1,2}$, $h_{1,3}$, and $h_{1,4}$.

The corresponding relationships between the pilot patterns 1-4 and the transmit antennas $11_1$ to $11_4$ of the base station are not limited to the above. For example, a pilot pattern 2 may be used for a transmit antenna $11_1$. Corresponding relationships between the transmit antennas and the pilot patterns of the base station may be maintained in a fixed manner or dynamically changed. This is because it suffices that the corresponding relationships are known at both the transmitter and the receiver.

5. Exemplary Operation of Base Station

Figure 8:
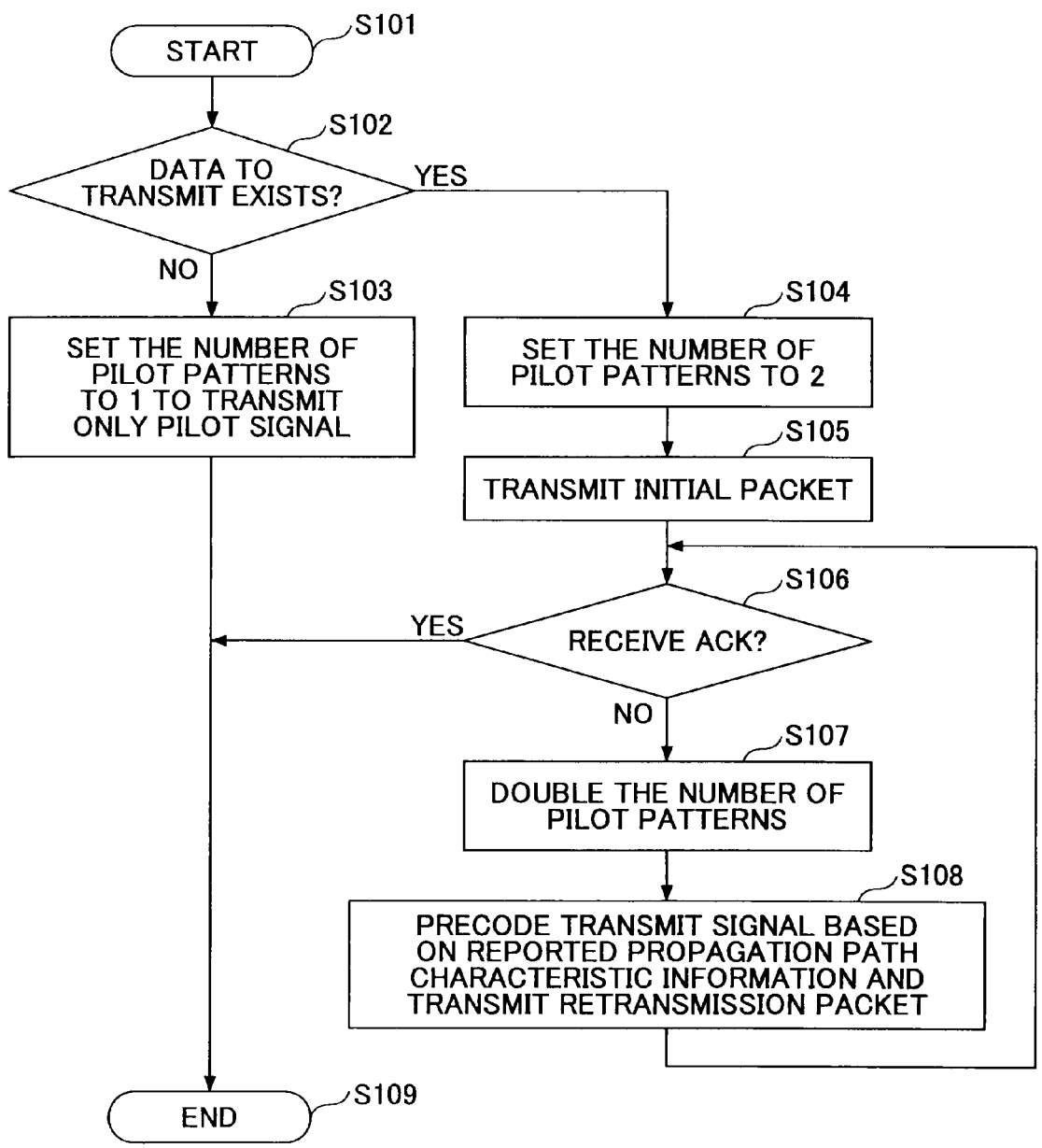
FIG. 8 is a flowchart illustrating an exemplary operation of a base station according to one embodiment.

FIG. 8 is a flowchart illustrating an exemplary operation of a base station according to one embodiment. As described with reference to FIGS. 2 and 3A, the base station transmits a signal using multiple antennas. For convenience, the number of transmit antennas is 4 (M=4), but any appropriate multiple number of antennas may be used.

In step s101, after the process of the base station 10 has started, the base station in step s102 deteimines the presence/absence of a downlink data signal to be transmitted to a specific mobile station. With respect to the presence/absence of the downlink signal, not merely whether data exist in a transmission buffer, but also for such data, whether a radio resource has been allocated using scheduling is determined. If there are no data to be transmitted, the process proceeds to step s103.

In step s103, a pilot pattern generator 17 (FIG. 3A) sets, into a pilot inserting unit 14, a pilot pattern common to four antennas as shown in FIG. 4. The base station inserts a pilot signal in a location specified by the common pilot pattern, and transmits, to the mobile station, a transmit frame which includes the pilot signal. Then, the process is completed.

In step s102, when it is determined that data to be transmitted exist, the process proceeds to step s104.

In step s104, a pilot pattern generator 17 (FIG. 3A) sets, into a pilot inserting unit 14, two pilot patterns A and B as shown in FIG. 6. The correspondence between the transmit antennas and the pilot patterns needs to be known at least at this time.

In step s105, a pilot signal, a control signal, a data signal, etc., are multiplexed according to the pilot patterns A and B, and the multiplexed transmit frames are transmitted from a base station to a mobile station as an initial packet.

In step S106, the base station 10 receives a report of detected results (ACK/NACK) from the mobile station 20 and determines whether the detected results reported is ACK or NACK. When ACK is reported, the process proceeds to step S109, completing the process. On the other hand, when NACK is reported, the process proceeds to step s107. When the mobile station reports NACK to the base station, the mobile station reports NACK and information illustrating a propagation path characteristic. The propagation path characteristic is measured at the mobile station by using a pilot signal received with a data signal in the same transmit frame.

In step s107, the number of pilot patterns is increased. The number of pilot patterns is doubled as an example, but it may be increased by any number. For example, assume that two pilot patterns A and B as shown in FIG. 6 are used, and NACK arrives at the base station when a transmit frame is transmitted to the mobile station. In this case, in step s107, the number of pilot patterns is increased such that four pilot patterns as shown in FIG. 7 are used in a retransmission transmit frame. The maximum number of pilot patterns is a total number of transmit antennas of the base station.

In step S108, a retransmission transmit frame is transmitted according to NACK. In this case, based on information of a propagation path characteristic reported from the mobile station with NACK, the base station precodes the transmit frame and transmits the retransmission transmit frame. Thereafter, the process returns to step s106, where the above-described process is performed based on an ACK/NACK signal reported to the transmitted retransmission packet.

6. Exemplary Operation of Base Station and Mobile Station

Figure 9:
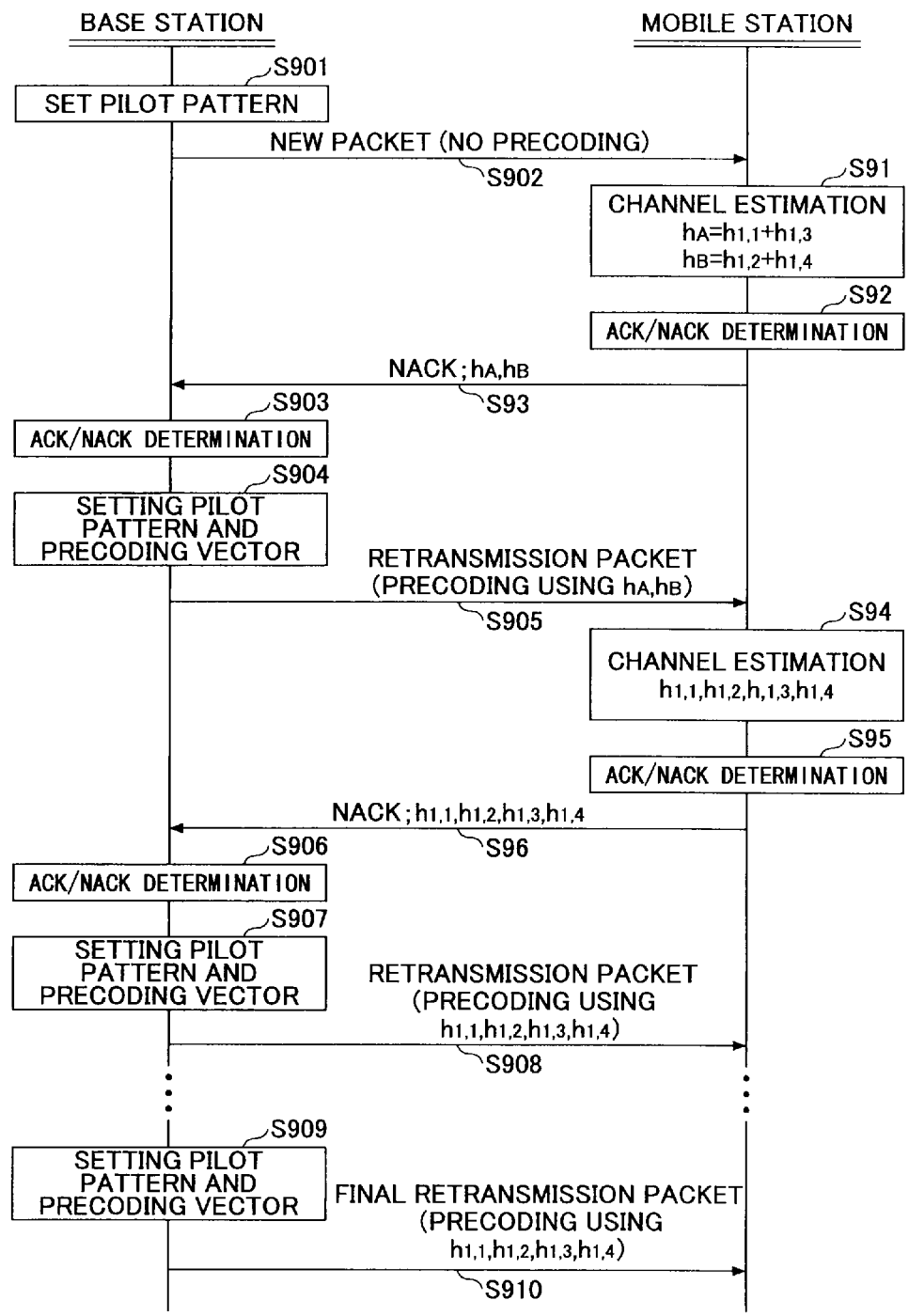
FIG. 9 is a flowchart illustrating an exemplary operation of a base station and a mobile station according to one embodiment.

FIG. 9 is an exemplary operation performed between the base station and the mobile station. Steps s901-s910 are performed primarily by the base station, while steps s91-s96 are performed primarily by the mobile station. Of the operations of the base station that have been described with reference to FIG. 8, steps s104 to s108 particularly relate to the exemplary operation of FIG. 9. First, at the base station, assume that it is determined to transmit a data signal to the mobile station. In FIG. 8, this corresponds to the operational flow proceeding from step s102 to step s104.

In step s901, a pilot pattern generator 17 (FIG. 3A) sets, into a pilot inserting unit 14, two pilot patterns A and B as shown in FIG. 6.

In step s902, a pilot signal, a control signal, a data signal, etc., are multiplexed according to the pilot patterns A and B, and the multiplexed transmit frames are transmitted from a base station to a mobile station as a new packet. At a stage in which the new packet is transmitted, the base station does not have most up-to-date information on the propagation path characteristics $h_{1,1}$, $h_{1,2}$, $h_{1,3}$, and $h_{1,4}$, so that a precoding process is not performed thereon. For the present exemplary operation, the precoding processor 15 (FIG. 3A) supplies a signal input from the pilot inserting unit 14 to the antenna unit 11 as it is. In other words, the new packet is transmitted without the precoding.

In step s91, the mobile station receives a transmit frame from the base station, and extracts, from a received signal, a pilot signal, a control signal, data signal, etc. The mobile station performs channel estimation based on the pilot signal, and demodulates the control signal based on the channel estimation result. Then, the data signal is demodulated based on the control signal.

In the present example, a pilot signal is transmitted in a pilot pattern A, B as shown in FIG. 6. As described above, the propagation path characteristic $h_A$ which is estimated based on the pilot pattern A is a combination of a propagation path characteristic $h_{1,1}$ between the transmit antenna $11_1$ of the base station and the receive antenna 21 of the mobile station and propagation path characteristic $h_{1,3}$ between the transmit antenna $11_3$ of the base station and the receive antenna 21 of the mobile station.

$$h_A = h_{1,1} + h_{1,3}$$

The propagation path characteristic $h_B$ which is estimated based on the pilot pattern B is a combination of a propagation path characteristic $h_{1,2}$ between the transmit antenna $11_2$ of the base station and the receive antenna 21 of the mobile station and propagation path characteristic $h_{1,4}$ between the transmit antenna $11_4$ of the base station and the receive antenna 21 of the mobile station.

$$h_B = h_{1,2} + h_{1,4}$$

In step s92, the mobile station detects the presence/absence of an error for a received data signal. Error detection may be preformed using a cyclic redundancy check (CRC), for example. The result of detection is expressed as acknowledgement (ACK) or non-acknowledgement (NACK).

In step s93, the mobile station reports the error checking result to the base station. If an error is not detected, ACK is reported to the base station. If an error is detected, NACK is reported to the base station. Moreover, when NACK is reported, the mobile station also reports, to the base station, information on estimated propagation path characteristic $h_A = h_{1,1} + h_{1,3}$ and $h_B = h_{1,2} + h_{1,4}$.

In step S903, the base station determines what the error checking result reported from the mobile station is. When an ACK is reported to the base station, packet transmission has been completed properly. When there are succeeding new data, a process for step s902 is repeated. In the present exemplary operation, it is assumed that NACK has been reported.

In step s904, the pilot pattern generator 17 (FIG. 3A) sets a different pilot pattern to a pilot inserting unit 14. A different pilot pattern is a pilot pattern as shown in FIG. 7. Therefore, in the retransmission transmit frame, pilot signals from four transmit antennas are mapped to respectively different resource elements. Moreover, in step 904, a precoding vector used in the precoding processor 15 (FIG. 3A) is set. The precoding vector is based on two propagation path characteristic information sets $h_A = h_{1,1} + h_{1,3}$ and $h_B = h_{1,2} + h_{1,4}$.

In step s905, the base station transmits a retransmission packet. The base station has already received, as information on the propagation path characteristic, a report on $h_A = h_{1,1} + h_{1,3}$ and $h_B = h_{1,2} + h_{1,4}$. Thus, the precoding processor 15 can handle a virtually single antenna element, putting together transmit antennas $11_1$ and $11_3$, and handle a virtually one antenna element, putting together transmit antennas $11_2$ and $11_4$ to precode for the number of elements of two (FIG. 3B, FIG. 5B). As a result, when the mobile station receives the retransmission packet, an effect of improvement in received quality using precoding with the number of elements of 2 may be expected.

In step s94, the mobile station receives a transmit frame from the base station, and extracts a pilot signal, a control signal, and a data signal from the received signal. The mobile station performs channel estimation based on the pilot signal, and demodulates the control signal based on the channel estimation result. Moreover, the data signal is demodulated based on the control signal.

In the present example, a pilot signal is transmitted in pilot patterns 1, 2, 3, and 4 as shown in FIG. 7. Therefore, a mobile station which has received a retransmission packet can estimate respective values of propagation path characteristics $h_{1,1}$, $h_{1,2}$, $h_{1,3}$, and $h_{1,4}$ and use the channel estimation result to demodulate data.

In step s95, the mobile station detects the presence/absence of an error for a received data signal.

In step s96, the mobile station reports the error checking result to the base station. If an error is not detected, ACK is reported to the base station. If an error is detected, NACK is reported to the base station. Moreover, when NACK is reported, the mobile station also reports, to the base station, information on estimated propagation path characteristic $h_{1,1}$, $h_{1,2}$, $h_{1,3}$, and $h_{1,4}$.

In step S906, the base station determines what the error checking result reported from the mobile station is. When an ACK is reported to the base station, packet retransmission has been completed properly. When there are succeeding new data, a process for step s902 is repeated. In the present exemplary operation, it is assumed that NACK has been reported.

In step s907, the pilot pattern generator 17 (FIG. 3A) may set a different pilot pattern to a pilot inserting unit 14. When the number of pilot patterns being set has already reached the total number of transmit antennas, it is not mandatory for a different pilot pattern to be set. In the present example, the number of transmit antennas is 4, and the set pilot patterns are four pilot patterns as shown in FIG. 7. Therefore, the pilot pattern is maintained as it is. In step 907, a precoding vector used in the precoding processor 15 (FIG. 3A) is set. This precoding vector is based on four propagation path characteristic information sets $h_{1,1}$, $h_{1,2}$, $h_{1,3}$, $h_{1,4}$.

In step s908, the base station further transmits a retransmission packet. The base station has already received, as information on the propagation path characteristic, a report of $h_{1,1}$, $h_{1,2}$, $h_{1,3}$, and $h_{1,4}$. Thus, the precoding processor 15 can precode the number of elements of four using transmit antennas $11_1$, $11_2$, $11_3$, and $11_4$ (FIG. 5C). As a result, when the mobile station receives the retransmission packet, an effect of improvement in received quality using precoding with the number of elements of 4 may be expected. A greater quality improvement may be expected as precoding is performed in step s908 which has the number of elements greater than in a case of retransmission in step s905.

Steps s909 and s910 will be described below.

Advantages on the Present Embodiment

In the present embodiment, a pilot pattern is changed depending on whether a packet to be transmitted to a mobile station is a new packet or a retransmission packet, and also depending on the number of times of retransmission of retransmission packet. In this way, when new packets are transmitted, for example, pilot signals are transmitted in two patterns to make it possible to reduce transmit frame overhead.

For transmitting a retransmission packet, in order to encourage quality improvement effect using precoding, the number of pilot patterns are increased with an increase in the number of retransmissions. In this way, the number of propagation paths which are identifiable in the mobile station increases. Information on these propagation paths can be fed back to the base station to make it possible for the base station to perform a more accurate precoding. In other words, a process of precoding with a large number of elements can be applied to succeeding retransmission packets. As a result, gain from the precoding can be gradually improved to make it possible to improve received signal quality at the mobile station.

For example, when the number of transmit antennas is four, in the related art method, an arrangement of pilot signals within a transmit frame is fixed in a uniform manner such that all information sets of the propagation path characteristic between each transmit antenna of the base station and the receive antenna of the mobile station may always be estimated. Therefore, the transmit frame, whether initial or retransmission, will end up having a large overhead. However, according to the present embodiment, the amount of radio resources consumed for the pilot signal may be flexibly changed depending on whether the transmit frame is a new packet or a retransmission packet, In this way, overhead of the transmit frame can be decreased as much as possible. Decreasing overhead makes it possible to improve throughput of the data signal or channel encoding makes it possible to decrease channel encoding rate.

7. First Variation

Next, a first variation of the embodiment is described. In the present variation, control for the number of retransmission packets reaching a maximum number of retransmission is added.

Figure 10:
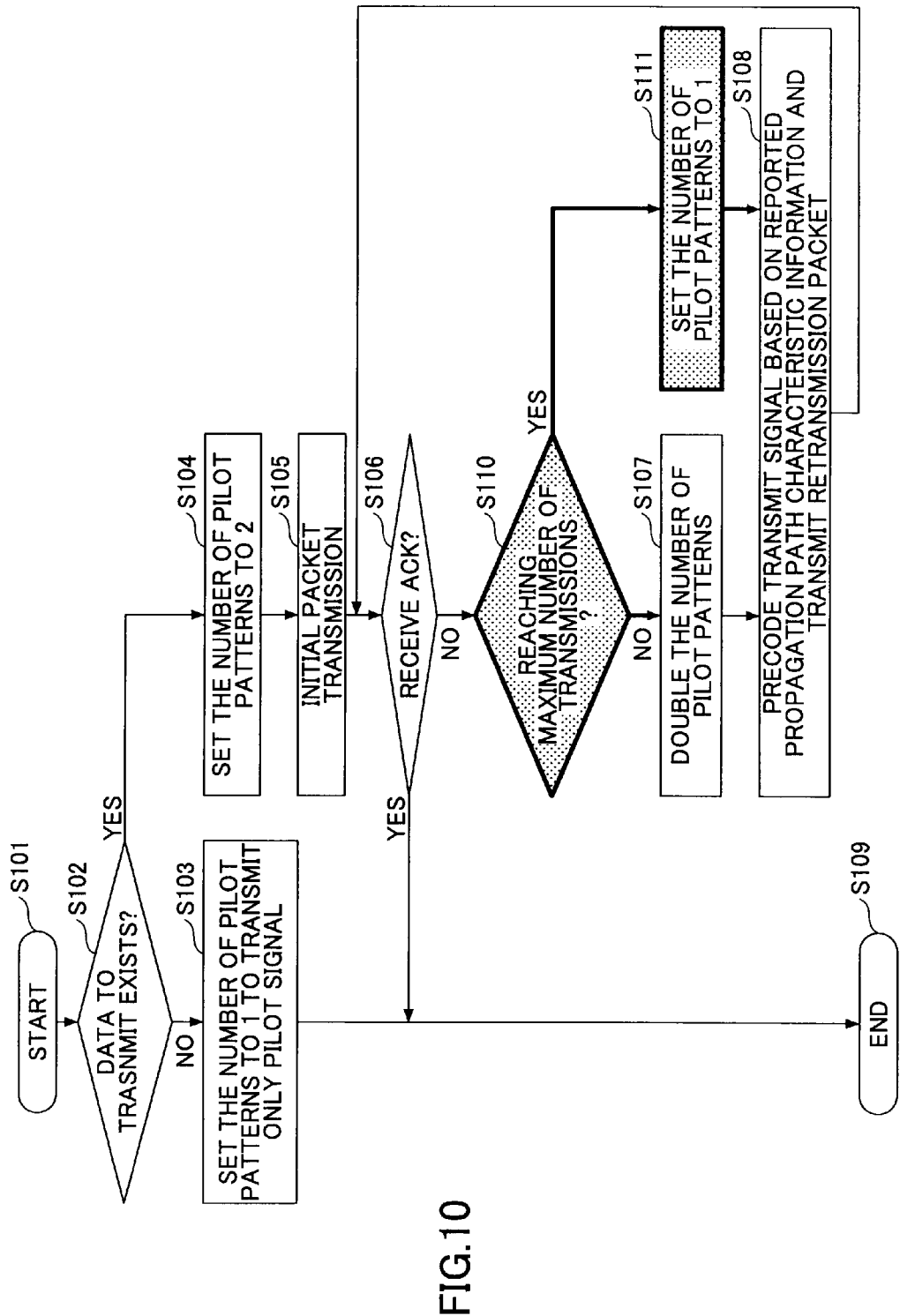
FIG. 10 is a flowchart illustrating an exemplary operation of a base station according to one variation.

FIG. 10 shows an exemplary operation of a base station according to the present variation. Generally, it is the same as the flowchart in FIG. 8, except that steps s110 and s111 are added. Repetitive explanations with respect to the already-explained step are omitted.

In the present variation, if NACK is received in step s106, the process proceeds to step s110.

In step s110, it is determined whether the number of times of retransmission reached the maximum number of retransmission times allowed. If the maximum number of retransmission times is not reached, the process proceeds to step s107. In step s107, as described above, the number of transmission pilot patterns is set such that it is doubled. On the other hand, if the maximum number of retransmission times is reached, the process proceeds to step s111.

In step s111, the pilot pattern is set to a pattern as shown in FIG. 4. In other words, for the final retransmission, pilot signals from each transmit antenna are all transmitted in the pattern shown in FIG. 4. If the number of retransmission times reaches the maximum value, the next retransmission is not performed even if the retransmission packet is not correctly received. Feedback of propagation path characteristic information for unperformed retransmission is not necessary. In this case, it suffices to have a pilot symbol for the mobile station to use for data detection. In step s111, the number of pilot patterns may be set to 1 to suppress overhead due to a pilot signal in the transmit frame.

While not explicitly illustrated in FIG. 10, when it is determined that the number of retransmissions has exceeded the maximum number of retransmissions in step s110, the packet retransmission is stopped and the process proceeds to step s109, completing the process.

(Exemplary Operation of Base Station and Mobile Station on First Variation)

Here, steps s909 and s919 shown in FIG. 9 are described.

In step s909, the number of retransmissions has reached a maximum number, so that the pilot pattern generator 17 (FIG. 3A) sets the number of pilot patterns in the pilot inserting unit 14 to 1. This pilot pattern is a pattern as shown in FIG. 4, for example. Moreover, in step 909, a precoding vector used in the precoding processor 15 (FIG. 3A) is set. In the present case, the number of transmit antennas is 4, and the number of pilot patterns in and after step 907 is maintained at 4 before proceeding step 909, so that this precoding vector is based on four sets of propagation path characteristic information $h_{1,1}$, $h_{1,2}$, $h_{1,3}$, and $h_{1,4}$.

In step s910, the base station transmits a final retransmission packet. In the same manner to step s908, information sets $h_{1,1}$, $h_{1,2}$, $h_{1,3}$, and $h_{1,4}$ are reported to the base station as propagation path characteristic information. Using the information sets, the precoding processor 15 can precode the number of elements of 4 using transmit antennas $11_1$, $11_2$, $11_3$, and $11_4$.

(Advantages on First Variation)

In the present variation, when the number of retransmission times of retransmission packets reaches the maximum number of times, the number of pilot patterns is set to 1. In this way, overhead due to the pilot signal may be reduced. For example, when the final retransmission is performed in the pilot pattern shown in FIG. 7, the number of resource elements taken up by the pilot signal in the transmit frame is 16. When the last retransmission is performed in the pilot pattern shown in FIG. 4, the number of resource elements taken up by the pilot signal in the transmit frame is 4. The present variation makes it possible to reduce overhead to $4/16=1/4$.

8. Second Variation

Next, a second variation of the embodiment is described. In the present variation, the channel encoding rate is adjusted in response to change in the pilot pattern.

Figure 11:
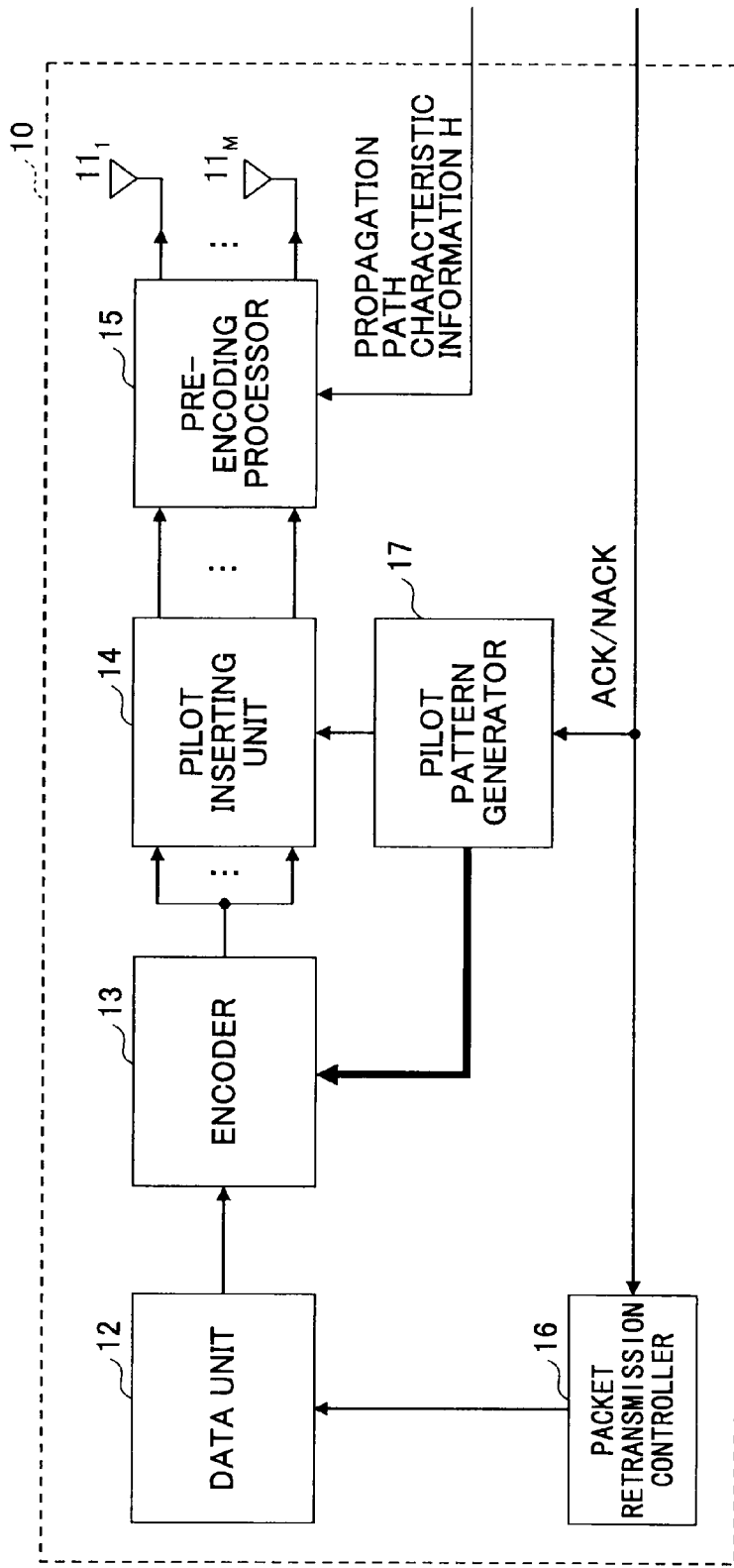
FIG. 11 is a functional block diagram of a base station according to a second variation.

FIG. 11 shows a functional block diagram of a base station according to the present variation. Generally, it is the same as FIG. 3A, except that the encoder 13 performs a process in response to instructions from the pilot pattern generator 17. Repetitive explanations with respect to the already-explained element are omitted.

In the same manner as the pilot pattern generator 17 in FIG. 3A, the pilot pattern generator 17 in FIG. 11 generates a pilot pattern based on ACK/NACK reported from the mobile station 20. In the present variation, the pilot pattern generator 17 reports, to the encoder 13, that the pilot pattern has increased. Alternatively, the pilot pattern generator 17 reports to the encoder 13, information on how overhead increases as a result of increased pilot patterns. The encoder 13 adjusts a channel encoding rate of a data signal based on information on the overhead increase. More specifically, the channel encoding rate is controlled such that the sum of the resource elements taken up by the pilot signal in the transmit frame, and the number of resource elements required for transmitting a channel-encoded data signal are maintained constant. In other words, even when the number of pilot channels has changed, the number of total resource elements including a pilot signal and a data signal is maintained at a constant.

Figure 12:
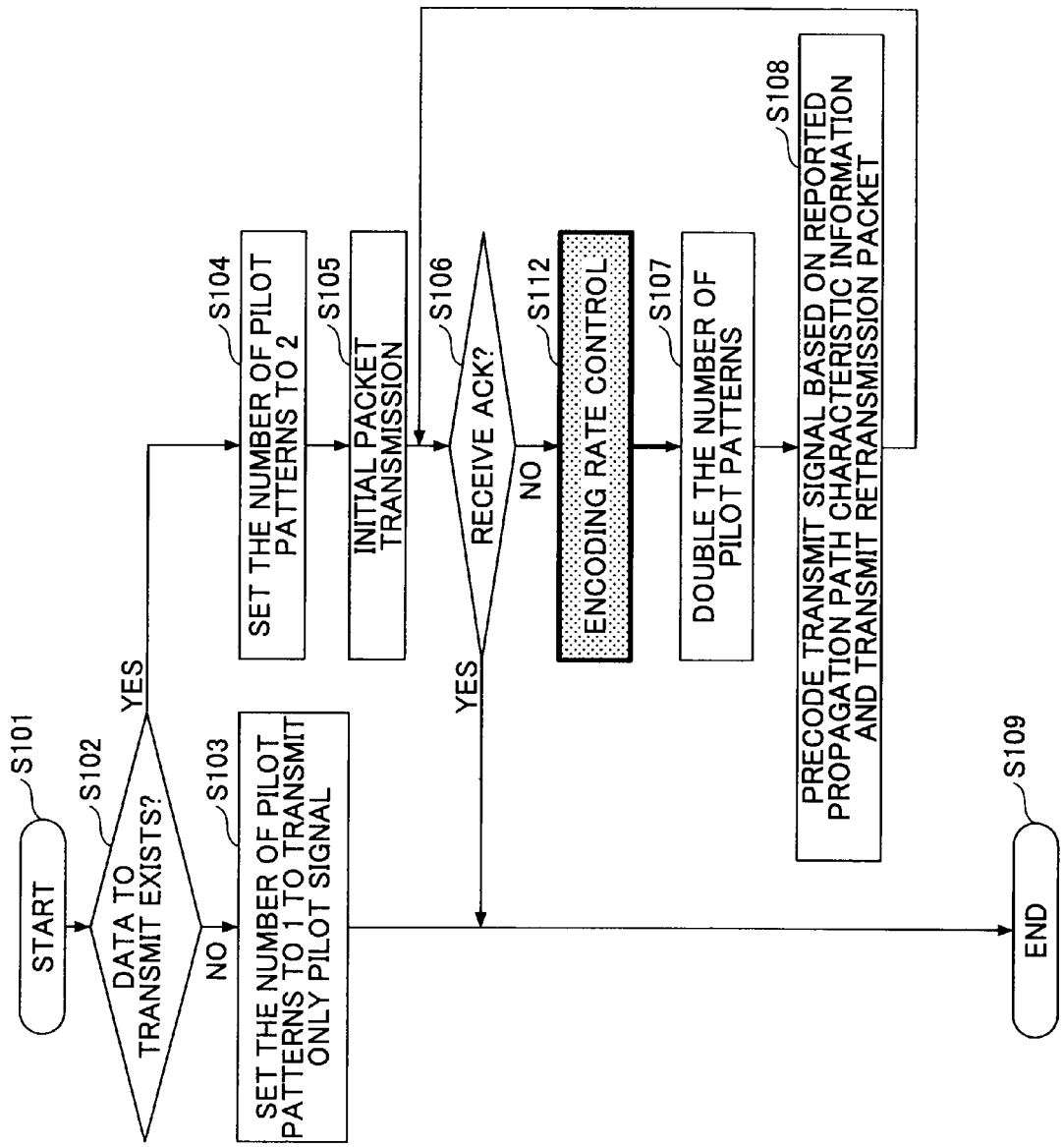
FIG. 12 is a flowchart illustrating an exemplary operation of the base station according to the second variation.

FIG. 12 shows an exemplary operation according to the present variation. Generally, it is the same as FIG. 8, except that step s112 has been added. Repetitive explanations with respect to the already-explained step are omitted. In the present variation, if NACK is received in step s106, the process proceeds to step s112.

In step s112, the channel encoding rate is controlled such that the sum of the number of resource elements taken up by the pilot signal in the transmit frame and the number of resource elements required for transmitting a channel-encoded data signal is kept constant. Below, the explained steps s107 and s108 are performed.

(Advantages on Second Variation)

In the present variation, the base station controls the data signal encoding rate in order to absorb an increase in overhead due to an increased number of pilot signals. Let us assume that the pilot pattern in FIG. 6 is used on a new packet when the number of transmit antennas is 4, for example. Assume that NACK is reported from the mobile station to the new packet and a pilot pattern in FIG. 7 is used for the retransmission packet. In the pilot pattern in FIG. 7, the number of resource elements of the pilot signal has doubled in comparison to FIG. 6, so that, if the present variation is not used, the transmit frame overhead also doubles. In this case, a resource for data transmission ends up decreasing as a result of an overhead increase. According to the present variation, the channel encoding rate is increased to decrease the number of bits of the channel encoded data signal, making it possible to decrease the number of resource elements needed for transmitting the channel-encoded data signal, and, thus, to absorb an increase in overhead. In this way, decreasing information to transmit in the retransmission packet becomes unnecessary.

For example, for a pilot pattern in FIG. 6, a pilot signal per transmit frame takes up 8 resource elements, the number of resource elements of the data signal becomes 160, and the number of resource elements in the resource block as a whole is 168. Here, assuming that the channel encoding rate in the data signal is 3/4 and BPSK (binary phase shift keying) is used as a modulation scheme, the number of bits in the channel-encoded data signal is 160, and the number of bits in the data signal before the channel encoding is 120. On the other hand, for the pilot pattern in FIG. 7, the pilot signal for each transmit frame takes up 16 resource elements. Here, assuming the channel encoding rate of 15/19, the number of bits after the channel encoding of the data signal becomes 120/(15/19)=152. As a result, it becomes the pilot signal (16 resource elements)+encoded data signal (152 resource elements)=168 (resource elements), making it possible to absorb an overhead increase. In this way, the number of pilot patterns is increased and precoding is accurately performed while seeking to improve the received quality.

9. The Other Variations

In the above-described embodiments, the number of pilot patterns has been doubled each time a packet retransmission is performed. The number of pilot patterns may be increased one by one each time retransmission is conducted, or alternatively it may be increased in any increments. While the pilot pattern is increased each time information equivalent to a new packet is retransmitted, the present invention is not limited to such an increase. For example, the same pilot pattern may be used for a new packet and a first retransmit packet, and a different pilot pattern may be used for a second retransmission packet. In the above embodiments, the number of pilot patterns is increased with the number of retransmission times, but the number may be kept the same. For example, the first retransmission packet is transmitted according to two pilot patterns A and B, and the second retransmission packet may be transmitted according to two different pilot patterns P and Q.

The present invention may be applied to any proper multi-carrier radio communications system in which precoding and retransmission control is performed. For example, the present invention may be applied to HSDPA/HSUPA W-CDMA, LTE, IMT-advanced, WiMAX and Wi-Fi systems, etc.

As described above, while the present invention is described with reference to specific embodiments, the respective embodiments are merely exemplary, so that a skilled person will understand variations, modifications, alternatives, replacements, etc. While specific numerical value examples are used to facilitate understanding of the present invention, such numerical values are merely examples, so that any appropriate value may be used unless specified otherwise. While specific mathematical expressions are used to facilitate understanding of the present invention, such mathematical expressions are merely examples, so that any appropriate mathematical expression may be used unless specified otherwise. A breakdown of embodiments or items is not essential to the present invention, so that matters described in two or more embodiments or items may be used in combination as needed, or matters described in a certain embodiment or item may be applied to matters described in a different embodiment or item as long as they do not contradict. For convenience of explanation, while the apparatuses according to the embodiments of the present invention are explained using functional block diagrams, such apparatuses as described above may be implemented in hardware, software, or a combination thereof. Software may be provided in a random access memory (RAM), a flash memory, a read-only memory (ROM), an EPROM, an EEPROM, a register, a hard disk (HDD), a removable disk, a CD-ROM, and any other appropriate storage medium. The present invention is not limited to the above embodiments, so that variations, modifications, alternatives, and replacements are included in the present invention without departing from the spirit of the present invention.

The present application is based on Japanese Priority Patent Application No. 2009-138649 filed Jun. 9, 2009, with the Japanese Patent Office, the entire contents of which are hereby incorporated herein by reference.

What is claimed is:

1. A radio communications apparatus, comprising:
a generator which generates a transmit frame; and
a transmitter which transmits the transmit frame via multiple transmit antennas, wherein
the transmit frame includes a predetermined number of resource elements having a predetermined frequency bandwidth and a predetermined symbol period, and
the generator generates the transmit frame such that the number of transmit antennas which are identifiable from a location of the resource element taken up by a pilot signal in a certain transmit frame is less than the number of transmit antennas which are identifiable from the location of the resource element taken up by the pilot signal in a retransmission transmit frame of the certain transmit frame.

2. The radio communications apparatus as claimed in claim 1, wherein the transmitter further includes a precoder, and the precoder precodes the retransmission transmit frame according to a radio propagation condition measured at a communications counterpart based on the pilot signal in the certain transmit frame.

3. The radio communications apparatus as claimed in claim 1 or 2, wherein the generator generates the transmit frame such that the number of transmit antennas which are identifiable from the location of the resource element taken up by the pilot signal in the retransmission transmit frame becomes twice the number of transmit antennas which are identifiable from the location of the resource element taken up by the pilot signal in the certain transmit frame.

4. The radio communications apparatus as claimed in claim 1, wherein the generator generates the transmit frame such that the number of transmit antennas which are identifiable from the location of the resource element taken up by the pilot signal in a final retransmission transmit frame becomes 1.

5. The radio communications apparatus as claimed in claim 1, wherein the generator includes a channel encoder, and the channel encoder adjusts a channel encoding rate for a data signal in the retransmission transmit frame such that the numbers of total resource elements including both pilot and data signals become equal in the retransmission transmit frame and the certain transmission frame.

6. A radio communications method, comprising the steps of:
generating a transmit frame; and
wirelessly transmitting the transmit frame via multiple transmit antennas, wherein
the transmit frame includes a predetermined number of resource elements having a predetermined frequency bandwidth and a predetermined symbol period, and
the generating step generates the transmit frame such that the number of transmit antennas which are identifiable from a location of the resource element taken up by a pilot signal in a certain transmit frame is less than the number of transmit antennas which are identifiable from the location of the resource element which is taken up by the pilot signal in a retransmission transmit frame of the certain transmit frame.

7. The radio communications method as claimed in claim 6, wherein the transmitting step further includes a precoding step, and the precoding step precodes the retransmission transmit frame according to a radio propagation condition measured at a communications counterpart based on the pilot signal in the certain transmit frame.

8. The radio communications method as claimed in claim 6 or 7, wherein the generating step generates the transmit frame such that the number of transmit antennas which are identifiable from the location of the resource element taken up by the pilot signal in the retransmission transmit frame becomes twice the number of transmit antennas which are identifiable from the location of the resource element taken up by the pilot signal in the certain transmit frame.

9. The radio communications method as claimed in claim 6, wherein the generating step generates the transmit frame such that the number of transmit antennas which are identifiable from the location of the resource element taken up by the pilot signal in a final retransmission transmit frame becomes 1.

10. The radio communications method as claimed in claim 6, wherein the generating step includes a channel encoding step, and the channel encoding step adjusts a channel encoding rate for a data signal in the retransmission transmit frame such that the numbers of total resource elements including both pilot and data signals become equal in the retransmission transmit frame and the certain transmission frame.

11. A radio communications system, comprising:
a base station; and
a mobile station, wherein
the base station includes
a generator which generates a transmit frame; and
a transmitter which transmits the transmit frame via multiple transmit antennas, the mobile station includes
- a receiver which receives the transmit frame;
- an estimator which estimates a radio propagation condition based on a pilot signal in the transmit frame; and
- a transmitter which transmits, to the base station, an estimation result by the estimator, the transmitter of the base station has a precoder which precodes the transmit frame based on an estimation result of the radio propagation condition received from the mobile station, the transmit frame includes a predetermined number of resource elements having a predetermined frequency bandwidth and a predetermined symbol period, and the generator generates the transmit frame such that the number of transmit antennas which are identifiable from a location of the resource element taken up by a pilot signal in a certain transmit frame becomes less than the number of transmit antennas which are identifiable from the location of the resource element taken up by the pilot signal within a retransmission transmit frame of the certain transmit frame.

12. The radio communications system as claimed in claim 11, wherein the precoder precodes the retransmission transmit frame according to a radio propagation condition measured at a communications counterpart based on the pilot signal in the certain transmit frame.

13. The radio communications system as claimed in claim 11 or 12, wherein the generator generates the transmit frame such that the number of transmit antennas which are identifiable from the location of the resource element taken up by the pilot signal in the retransmission transmit frame becomes twice the number of transmit antennas which are identifiable from the location of the resource element taken up by the pilot signal in the certain transmit frame.

14. The radio communications system as claimed in claim 11, wherein the generator generates the transmit frame such that the number of transmit antennas which are identifiable from the location of the resource element taken up by the pilot signal in a final retransmission transmit frame becomes 1.

15. The radio communications system as claimed claim 11, wherein the generator includes a channel encoder, and the channel encoder adjusts a channel encoding rate for a data signal in the retransmission transmit frame such that the numbers of total resource elements including both pilot and data signals become equal in the retransmission transmit frame and the certain transmission frame.

* * * * *